United States Patent Office 2,915,248
Patented Dec. 1, 1959

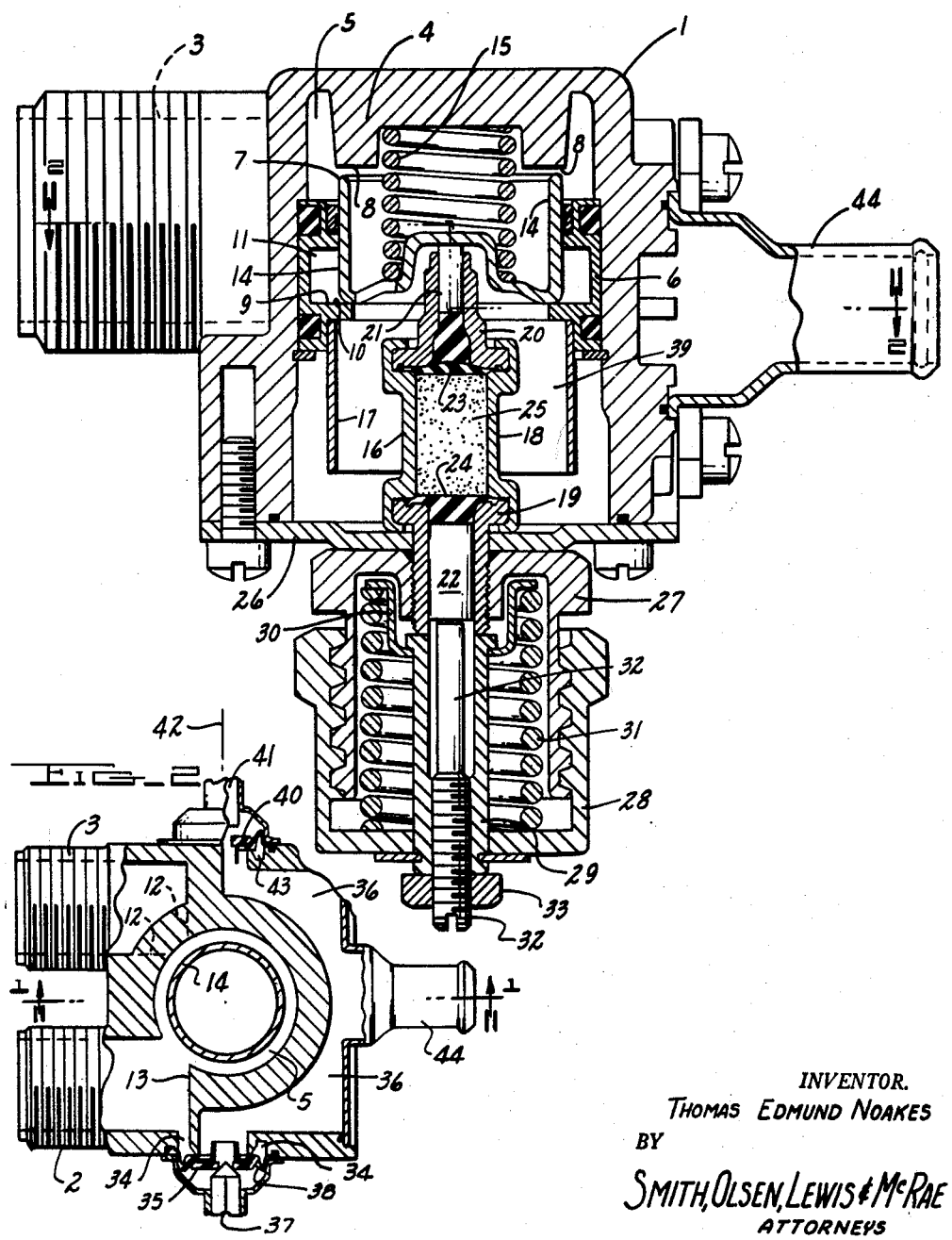

2,915,248

THERMOSTATIC VALVE HAVING ADJUSTABLE TEMPERATURE SETTING

Thomas Edmund Noakes, Detroit, Mich., assignor, by mesne assignments, to American Radiator & Standard Sanitary Corporation, New York, N.Y., a corporation of Delaware Application March 18, 1957, Serial No. 646,616

1 Claim. (Cl. 236—12)

This invention relates to thermostatic power elements, mechanisms for adjusting the operating temperature ranges thereof, and mechanisms associated therewith for preventing parts damage in the event of excessive operating temperatures. The principles of the invention may be incorporated in such devices as hot-cold water mixing valves, thermostatic switches and waterline thermostats.

Objects of the invention are to provide a power element wherein:

(1) the operating temperatures may be adjusted or calibrated within comparatively wide ranges, (2) the "operating temperature" adjustment is economically incorporated with an "overtravel" mechanism for parts protection in the event of excessively high power element temperatures, and (3) the "operating temperature" adjustment may be obtained without varying the power element working stroke, thereby avoiding any hysteresis due to working stroke variations.

Other objects of this invention will appear in the following description and appended claim, reference being had to the accompanying drawings forming a part of this specification wherein like reference characters designate corresponding parts in the several views.

In the drawings:

Fig. 1 is a sectional view of a hot-cold water mixing valve utilizing features of the invention. Fig. 1 is taken on line 1—1 in Fig. 2.

Fig. 2 is a sectional view taken substantially on line 2—2 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a valve housing 1 which is internally contoured to provide a "hot fluid" inlet chamber 2 and a "cold fluid" inlet chamber 3. Chamber 2 is partially formed by a circular projection 4 which extends downwardly into the housing to form an annular chamber portion 5. Annular portion 5 communicates with the upstream portion of chamber 2 through a passage 13. An annular insert 6 is fixedly positioned within housing 1 to cooperate with projection 4 in the formation of an annular "hot fluid" port 7 and annular seat 8.

Insert 6 includes an annular flange 9 which forms a "cold fluid" seat 10. Inlet chamber 3 includes the annular chamber portion 11 which communicates with the upstream portion of chamber 3 through a passage 12. The construction of housing 1 (including insert 6) is such that hot fluid is introduced into annular section 5, and cold fluid is introduced into annular section 11.

A port-closing element 14 is positioned within housing 1 for reciprocal movement between seats 8 and 10 so as to vary the relative amounts of hot and cold fluids. At low fluid temperatures a compression spring 15 biases element 14 toward seat 10 so as to increase the flow of hot fluid and thereby raise the outlet fluid temperature. At high fluid temperatures a thermostatic power element 16 biases element 14 toward seat 8 so as to reduce the flow of hot fluid and thereby lower the outlet fluid temperature. A fixed annular wall 17 baffles the fluid from seats 8 and 10 downwardly around the power element so as to effect quick power element response to fluid temperature change.

Power element 16 includes a tubular casing 18 having axially aligned openings in its opposite end walls 19 and 20. Pistons 21 and 22 extend through these openings into pressure engagement with rubber sealing members 23 and 24. A pellet 25 of wax or other thermally expansible material is contained between members 23 and 24. Pellet 25 is preferably a solid material which during liquification undergoes a gradual volumetric increase in response to temperature increase over a range of temperatures, in contrast to a material which during transition to the liquid undergoes substantial volumetric increase at a single temperature. Pellet 25 may be compounded with copper particles or other heat conductive material to increase the time response characteristics of element 16.

Wall 19 of element 16 is threaded through wall 26 of housing 1 into a cup 27, which is fixedly secured against the housing. A second cup 28 is threaded onto cup 27, and an internally threaded sleeve 29 slidably extends through the bottom wall of cup 28 into engagement with the lower end of wall 19. An annular retainer 30 holds compression spring 31 in position for biasing sleeve 29 upwardly into its Fig. 1 position. A threaded shaft 32 is turned up in sleeve 29 to a position of adjustment determined by the desired operating temperature of element 16. Nut 33 locks shaft 32 in its adjusted position.

Spring 31 is stronger than spring 15. Accordingly, when shaft 32 is in its illustrated position piston 22 is prevented from downward movement. As a result any increase in temperature of the fluid within mixing chamber 39 is effective on pellet 25 to immediately force piston 21 upwardly and thereby move element 14 toward a postion against seat 8. If the fluid temperature within chamber 39 should become excessively high spring 31 will yield to allow the assembly of piston 22, shaft 32, sleeve 29, and retainer 30 to move downwardly. In this manner "overtravel damage" is avoided.

When shaft 32 is adjusted downwardly in sleeve 29 its upper end is spaced from the lower end of piston 22. As a result any initial expansion of pellet 25 due to fluid temperature increase in chamber 34 causes piston 22 to move downwardly; at this time spring 15 holds element 14 against seat 10. When piston 22 strikes shaft 32 continued expansion of pellet 25 is effective to move piston 21 upwardly so as to bias element 14 toward seat 8. It will thus be seen that adjustment of shaft 32 in sleeve 29 is effective to vary the fluid temperature at which piston 21 begins to move element 14 toward seat 8; the lower the position of shaft 32 the higher will be the "operating" temperature of piston 21.

It will be noted that the diameter of piston 22 is considerably larger than that of piston 21. As a result any unit adjustment of piston 22 in its wall 19 effects a comparatively great change in the internal volume of casing 18. For this reason the adjustment of piston 22 necessary to effect a given change in the operating temperature of piston 21 is comparatively small. This feature enables adjustment of the operating temperature over wide limits.

Power element adjustments have been previously devised wherein the power element casing was bodily moved to effect the adjusting action. However in these devices the adjustment of the working piston (corresponding to piston 21) was only as great as the movement of the power element casing; as a result the operating temperatures could not easily be varied over wide limits. One disadvantage with this prior art adjustment lies in the fact that the working piston must move different distances in its guide sleeve at different adjusted positions of the power element casing. As a result the "hysteresis" losses can be excessive, often to such an extent as to materially limit the amount of adjustment movement.

Referring to the instant valve construction, it will be noted that hot fluid inlet chamber 2 is connected to an annular passage 34 which is closed by a diaphragm 35. A passage 36 is arranged to receive hot fluid from passage 34. A solenoid-operated plunger 37 is positioned to close the central opening in the diaphragm so as to allow fluid from passage 34 to flow through small opening 38 and bias the diaphragm to a closed position. When plunger 37 is withdrawn from the central diaphragm opening by its solenoid the fluid pressure in passage 34 opens the diaphragm.

Passage 36 not only receives hot fluid from passage 34 but it also receives mixed temperature fluid from chamber 39. A diaphragm 40, operated by a solenoid plunger 41, is arranged to control the admission of fluid from chamber 39 to passage 36. Diaphragm 40 is only partially shown in Fig. 2, it being appreciated that the section to the left of centerline 42 is taken along a different line than the section to the right of centerline 42. Chamber 39 is connected with passage 36 by an annular passage 43 which is similar to passage 34. Passage 36 leads to an outlet spigot 44.

The operation of the illustrated valve is such that diaphragm 35 may be opened to supply hot fluid from by-pass passage 34 to outlet chamber 36. When diaphragm 35 is closed and diaphragm 40 is opened mixed temperature fluid is admitted from chamber 39 to outlet chamber 36.

I claim:

The combination comprising a valve housing forming an end wall; port means internally of the housing forming a valve seat; a port-closing element movable toward and away from said seat; a power element casing fixedly positioned in said housing on the aforementioned end wall and having axially aligned guide sleeves on its opposite ends; a first piston extended through one of said guide sleeves for moving said port-closing element; a second piston extending within the other guide sleeve; a single body of thermally expansible material within said casing, both of said pistons being in pressure engagement with said thermally expansible body; a cup structure positioned on the external face of said housing end wall; an internally threaded sleeve slidably mounted in the cup structure in engagement with the second guide sleeve; a threaded shaft positioned in said threaded sleeve for adjustment toward and away from the second piston; a spring retainer carried by the internally threaded sleeve; and a compression spring surrounding said internally threaded sleeve in abutment with the cup structure and retainer so as to releasably urge the internally threaded sleeve against the second guide sleeve.

References Cited in the file of this patent

UNITED STATES PATENTS

| | | |
|---|---|---|
| 353,186 | Westinghouse | Nov. 23, 1886 |
| 1,176,727 | Clorius | Mar. 21, 1916 |
| 2,335,761 | Hultman | Nov. 30, 1943 |
| 2,620,134 | Obermaier | Dec. 2, 1952 |
| 2,714,488 | Von Wangenheim | Aug. 2, 1955 |
| 2,805,025 | Dillman | Sept. 3, 1957 |

FOREIGN PATENTS

| | | |
|---|---|---|
| 621,261 | Great Britain | Apr. 6, 1949 |